US006958449B1

(12) United States Patent
Ziebart et al.

(10) Patent No.: US 6,958,449 B1
(45) Date of Patent: Oct. 25, 2005

(54) WATERPROOF TWIST-ON CONNECTOR FOR ELECTRICAL WIRES

(75) Inventors: Bernard J. Ziebart, Pewaukee, WI (US); Michael F. Bedwell, Brookfield, WI (US); Andrew J. Bonlender, Brown Deer, WI (US)

(73) Assignee: Actuant Corporation, Milwaukee, WI (US)

( * ) Notice: Subject to any disclaimer, the term of this patent is extended or adjusted under 35 U.S.C. 154(b) by 0 days.

(21) Appl. No.: 10/944,595

(22) Filed: Sep. 17, 2004

(51) Int. Cl.$^{7}$ ............................ H01R 4/00; H02G 3/06

(52) U.S. Cl. ..................... 174/84 R; 174/87; 174/94 R

(58) Field of Search ............................ 174/74 R, 75 R, 174/75 F, 77 R, 84 R, 84 C, 87, 88 R; 439/447, 439/449, 456

(56) References Cited

U.S. PATENT DOCUMENTS 3,519,707 A * 7/1970 Krup .......................... 264/249
3,550,765 A 12/1970 Anderson
3,783,177 A 1/1974 Keiso
3,889,047 A * 6/1975 Carver ..................... 178/84 R
3,934,076 A 1/1976 Smith
4,227,040 A * 10/1980 Scott ........................... 174/87
4,288,657 A * 9/1981 Swanson ..................... 174/87
4,691,079 A * 9/1987 Blaha .......................... 174/87
5,023,401 A * 6/1991 Clifton ........................ 174/87
5,023,402 A 6/1991 King, Jr. et al.
5,113,037 A * 5/1992 King et al. .................... 174/87
5,132,494 A * 7/1992 Burton et al. ................. 174/87
5,151,239 A 9/1992 King, Jr.
5,260,515 A * 11/1993 Braun, Jr. .................... 174/87
5,315,066 A 5/1994 Spiteri, Sr.
5,431,758 A 7/1995 Delalle
5,557,069 A * 9/1996 Whitehead et al. ........... 174/87
5,557,070 A * 9/1996 Tamm .......................... 174/87
5,559,307 A * 9/1996 Whitehead et al. ........... 174/87
5,771,578 A 6/1998 King, Jr. et al.
5,894,110 A * 4/1999 Simmons et al. ............. 174/87
6,198,049 B1 * 3/2001 Korinek ....................... 174/87

OTHER PUBLICATIONS

"Loctite: The Adhesive Sourcebook," 2003, pp. 32-33, vol. 3, Henkel Loctite Corporation, U.S.A.
"Loctite Product Description Sheet: Product 515," Oct. 1996; Loctite Corporation, Conneticut.

* cited by examiner

*Primary Examiner*—William H. Mayo, III
(74) *Attorney, Agent, or Firm*—Quarles & Brady LLP

(57) ABSTRACT

A twist-on connector for joining ends of electrical conductors has a shell of electrically insulating material with an aperture. An anaerobic sealant is within the aperture. Prior to use, the volume of sealant is sufficiently large so that curing of the sealant is inhibited. Upon insertion of wires into the shell, the anaerobic sealant is dispersed into gaps between the wires and the shell that are sufficiently small to trigger curing of the anaerobic sealant into a hardened state.

15 Claims, 2 Drawing Sheets

WATERPROOF TWIST-ON CONNECTOR FOR ELECTRICAL WIRES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to twist-on type connectors for electrical wires; and more particularly to such connectors for use outdoors and in other wet environments.

2. Description of the Related Art

The ends of two or more wires of an electrical circuit are often connected together using a twist-on type wire connector, such as the one shown in U.S. Pat. No. 6,252,170. These connectors commonly have a conical shaped body of insulating material, such as plastic, with an opening at the larger end that communicates with a tapered aperture. A conical, helical metal coil often is provided within the tapered aperture to engage and secure metal conductors of the wires together. This type of connector is available in a variety of sizes to accommodate various gauges and numbers of wires.

To electrically connect two or more wires, the insulation is stripped from the ends of each wire to expose a short section of the metal conductor. The fastening operation is performed by inserting the stripped ends of the wires into the open end of the connector body. The connector is rotated so that the helical metal coil screws onto the wires, twisting the bare sections of the metal conductors together to form an electrical connection. The metal coil engages each wire to mechanically hold the connector body on the twisted bundle of wires. Although the primary electrical connection is provided by the direct contact between the twisted bare conductors, a second electrical path is provided by the metal coil.

Most of the twist-on wire connectors are limited to use indoors or in a sealed enclosure where moisture can not enter the connector and adversely affect the electrical connection. However, for wet environments similar connectors are available with a sealant that surrounds the wires to act as a barrier to water penetration. U.S. Pat. No. 5,113,037 describes a twist-on wire connector filled with a viscous sealant that surrounds and encapsulates the bare ends of the wires upon insertion into the connector. That sealant does not harden, but remains sufficiently viscous so that the connector can be removed from the wires and then reattached. U.S. Pat. No. 5,315,066 teaches a wire connector that contains a two-part epoxy cement in which the parts become mixed when the wires are inserted and the connector is twisted onto the wires. The mixed epoxy cement then hardens so that the connector is secured onto the wires and cannot be removed. With this latter type of connector, care must be taken so that the two-part epoxy cement does not mix, and thus harden, prematurely while the connector is being stored prior to use.

SUMMARY OF THE INVENTION

A twist-on connector is provided to connect electrical wires. The connector has a shell of electrically insulating material with an aperture extending from an open end of the shell in which to receive bare conductors of the electrical wires. In a preferred embodiment, a metal helical coil is within the aperture to engage the bare conductors. An anaerobic sealant is contained within the aperture of the shell. This type of sealant cures into a hardened state in the absence of air. However, the relatively large volume of the sealant in the shell prior to insertion of wires into the connector inhibits curing of the sealant. When the electrical wires are inserted into the aperture, the anaerobic sealant is dispersed into gaps between the wires and the shell that are sufficiently small to trigger curing of the anaerobic sealant into a hardened state.

DETAILED DESCRIPTION OF THE INVENTION

Figure 1:
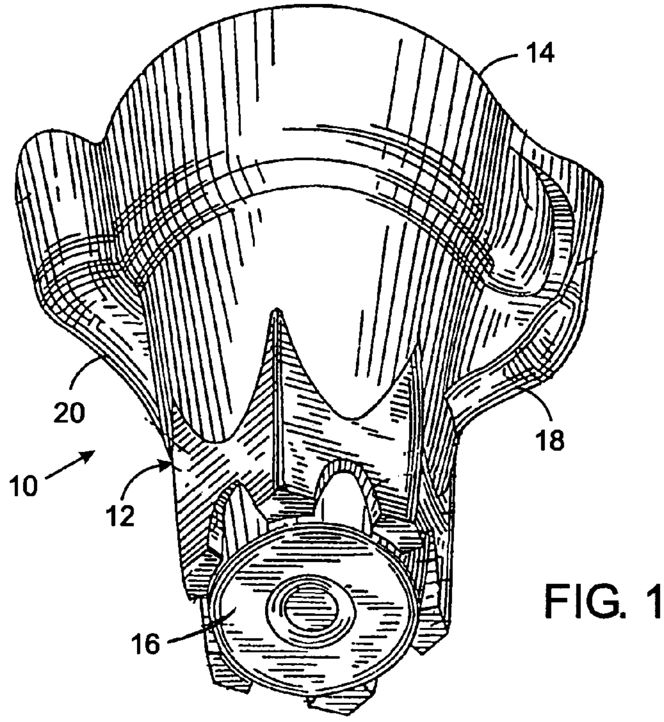
FIG. 1 is an isometric view of a twist-on wire connector having a water proof sealant according to the present invention.

Referring to FIG. 1, a twist-on wire connector 10 includes a hollow shell 12 having a general shape of a truncated cone. The shell 12 preferably is formed of molded plastic, so as to be electrically insulating, and has an open end 14 which tapers to a smaller diameter closed end 16. As the outer surface of the shell 12 tapers toward the closed end 16, a transition occurs from a generally round open end 14 to a hexagonal closed end that enables engagement by a wrench or socket for fastening the connector 10.

The wire connector 10 also includes a pair of wings 18 and 20 which project radially outward from the shell 12 adjacent the open end 14. As will be described, the wire connector 10 is fastened onto wires by turning it in the clockwise direction. The curved surface of each wing 18 and 20 has grooves which aid the fingers of a user to grip the wire connector during that turning operation. It should be understood that the present inventive concept may be utilized with a variety of different shaped connector shells, including those which do not have wings.

Figure 2:
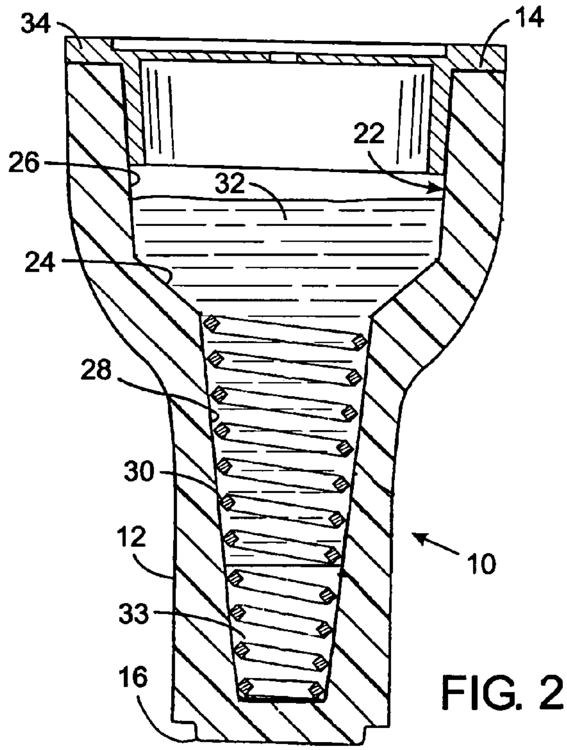
FIG. 2 is an axial cross-section view of the wire connector prior to use.

Referring to FIG. 2, the open end 14 of the wire connector 10 has a circular aperture 22 extending axially into the shell 12 and terminating a short distance from the closed end 16. The aperture 22 tapers in a narrowing manner reaching a beveled shoulder 24 approximately one-third the depth of the aperture. The shoulder 24 defines an outer section 26 of the aperture 22 and a smaller tapering inner section 28.

A conical, helical coil 30 made of electrically conductive metal is wedged into the tapering inner section 28 of the aperture 22. Preferably the coil is formed of spring steel, but other metals may be employed. The coil 30 is formed by winding a piece of wire into an elongated helix which tapers along its longitudinal axis. The wire used for the coil may have a circular, diamond or another geometric cross section, as are well known in the art.

The connector shell 12 contains a single-part, water-resistant, anaerobic sealant 32 within the aperture 22. As used herein, a single-part anaerobic sealant refers to a material in which the components are premixed and do not require mixing by a user, as compared to a sealant comprising a resin and a separate hardener, for example, which are mixed immediately prior to or during use of the connector. Suitable non-electrically conductive, anaerobic sealants are commerically available, such as Loctite® brand Flange Sealant 515 that is available from Henkel Loctite Corporation, Rocky Hill, Conn., U.S.A. Anaerobic sealants of this type harden in the absence of air when squeezed very thin (e.g. less than 0.76 millimeters) to form a gasket between two pieces of metal. The volume of the aperture of a typical twist-on wire connector is sufficiently large that material does not cure into a hardened state while the connector is being stored prior to use. Thus the anaerobic sealant 32 remains in a fluid state in the connector shell 12 prior to insertion of electrical conductors.

Depending upon the size of the connector 10 and more specifically the aperture 22 therein, the bottom section of the aperture may be sufficiently small that any anaerobic sealant therein would begin to cure into the hardened state while the connector is being stored prior to use. Therefore, when the anaerobic sealant 32 is fed into a shell 12 with such a small aperture, a region 33 containing trapped air is created at the bottom of the aperture 22. This prevents premature hardening of the anaerobic sealant.

Figure 3:
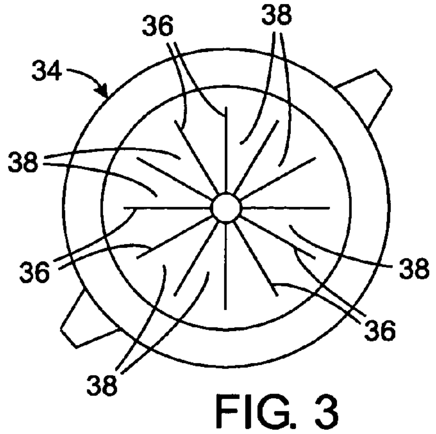
FIG. 3 is a top view of a closure member of the wire connector.

A plastic cap 34 fits into and closes the open end 14 of the shell 12 to close the aperture and prevent the sealant from leaking out and contaminates from entering during storage prior to use. The cap 34 has a tubular portion that extends into the aperture 22 a tightly engaging the inner surface of the shell. With additional reference to FIG. 3, the central region of the cap 34 has a plurality of score lines 36 extending radially from the center thereby defining a plurality of triangular segments 38 between those score lines. As will be described, the score lines 36 enable wires to penetrate the cap during the connection process. Alternatively, a thin foil, plastic or paper cover may be adhered to the open end 14 of the shell 12 to serve the same purpose as the cap 34. Other types of closure members also can be used to close the open end of the shell 12.

Figure 4:
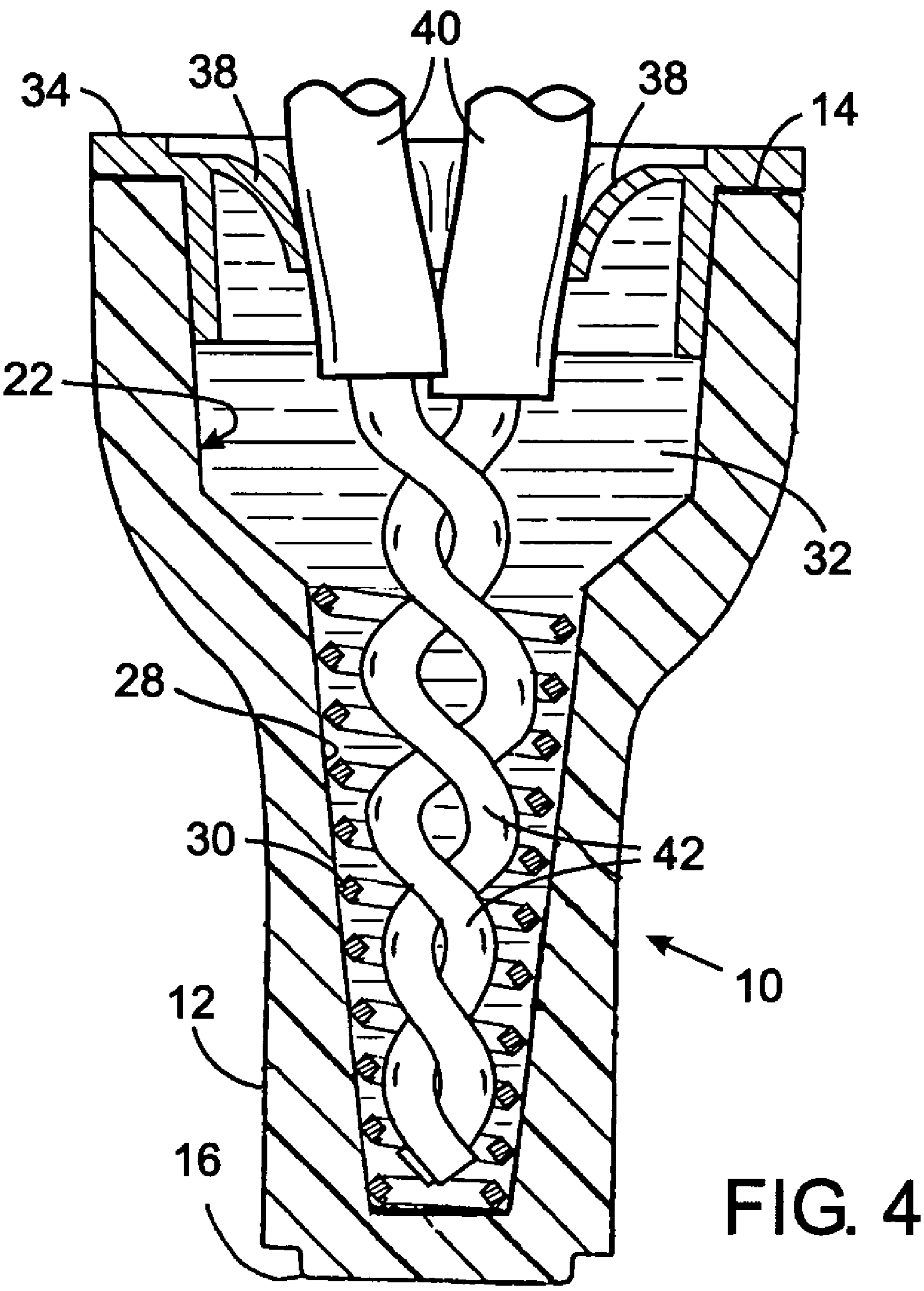
FIG. 4 is an axial cross-sectional view through the wire connector showing connection of a pair of wires.

To make an electrical connection, insulation is stripped from the ends of two or more wires 40 to expose the metal, usually copper, electrical conductors 42. The ends of the wires 40 then are inserted through the cap 34 into aperture 22 of the shell 12, as shown in FIG. 4. A opening for the wires 40 is created in the central region of the cap 34 as the score lines 36 tear open and the segments 38 flex inward under the insertion force of the wires. After insertion of the wires 40, the user either places fingers onto the wings 18 and 20 or applies a hexagonal socket wrench to the closed end 16 of the connector. Next the connector 10 is turned so that the coil 30 screws onto the ends of the electrical conductors 42, drawing the wires farther into both the aperture 22 and the coil 30. This screwing action twists the conductors around each other, which establishes electrical contact there between. The contact between the connector coil 30 and the electrical conductors 42 also provides a path for electricity to flow among those conductors.

As the wires 40 are inserted and twisted in the connector 10, the anaerobic sealant 32 is squeezed into the relatively small gaps between the electrical conductors 42 and between those conductors and the coil 30. The sealant also flows toward the open end of the connector shell 12 encasing the insulation around the conductors. Therefore the electrical conductors 42 become encapsulated in the sealant. The cap 34 confines the anaerobic sealant 32 from oozing out the open end of the shell 12 and aids in forcing the sealant against the wires 40. The anaerobic sealant 32 begins to cure when its volume within the smaller tapering inner section 28 of the aperture 22 is reduced to those small gaps. In addition, removal of the insulation from the ends of the wires 40 causes the exposed metal electrical conductors 42 to act as a catalyst for the curing process. The sealant adjacent the coil 30 and the exposed electrical conductors 42 cures within approximately 24 hours. The anaerobic sealant 32 hardens as it cures, so that the electrical conductors 42 are bonded to the coil 30 which prevents separation of those elements. The cured, hardened anaerobic sealant 32 encapsulates the wires within the connector and provides a barrier that prevents moisture from reaching the electrical conductors 42, even in an extremely wet environment.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A connector for connecting conductors of a plurality of electrical wires, said connector comprising:

a shell of electrically insulating material having an opening for receiving the conductors and having an aperture extending from the opening to a closed end; and an anaerobic sealant within the aperture of the shell wherein curing of the sealant into a hardened state is inhibited until the electrical wires are inserted into the aperture at which time the anaerobic sealant is dispersed into gaps between the wires and the shell that are sufficiently small to trigger curing of the anaerobic sealant into a hardened state.

2. The connector as recited in claim 1 wherein the shell has a region at the closed end of the aperture that is void of the anaerobic sealant.

3. The connectors recited in claim 1 wherein the anaerobic sealant is a single-part material that does not require mixing in the shell to initiate curing.

4. The connector as recited in claim 1 further comprising an element within the aperture which engages electrical wires that are inserted into the shell.

5. The connector as recited in claim 1 further comprising a helical coil of an electrically conductive metal within the aperture of the shell.

6. The connector as recited in claim 1 further comprising a closure member extending across the opening of the shell.

7. The connector as recited in claim 6 wherein the closure member has a plurality of segments which flex inward in response to insertion of the conductors into the shell.

8. A connector for connecting conductors of a plurality of electrical wires, said connector comprising:

a shell of electrically insulating material having a frustoconical shape with an aperture extending from a opening in the shell to closed end, the aperture tapering inwardly from proximate the opening toward the closed end;

an electrically conductive insert within the aperture of the shell for engaging the conductors upon insertion into the shell; and an anaerobic sealant within the aperture for encapsulating the conductors upon insertion into the shell, wherein curing of the sealant into a hardened state is inhibited until the conductors are inserted into the aperture at which time the anaerobic sealant is dispersed into gaps between the wires and the shell that are sufficiently small to trigger curing of the anaerobic sealant into a hardened state.

9. The connector as recited in claim 8 wherein the aperture of the shell has an outer tapered section proximate the opening, a beveled section tapering inwardly from the outer tapered section to an inner tapered section that extends inwardly from the beveled section to the closed end.

10. The connector as recited in claim 8 wherein the shell has a region at the closed end of the aperture that is void of the anaerobic sealant.

11. The connectors recited in claim 8 wherein the anaerobic sealant is a single part material which does not require mixing in the shell to initiate curing.

12. The connector as recited in claim 8 wherein the electrically conductive insert comprises a helical coil.

13. The connector as recited in claim 8 wherein the electrically conductive insert comprises a helical coil of an electrically conductive metal and having a conical shape.

14. The connector as recited in claim 8 further comprising a closure member extending across the opening of the shell.

15. The connector as recited in claim 14 further comprising wherein the closure member has a plurality of segments which flex inward in response to insertion of the conductors into the shell.

* * * * *